May 14, 1963 J. R. SCANTLIN ETAL 3,090,013

TRANSISTOR OSCILLATOR HAVING TRANSFORMER FEEDBACK

Original Filed Oct. 4, 1956

INVENTORS
JOHN R SCANTLIN
RALPH W. HAAS
BY
Greene and Durr 3,090,013

L-C TRANSISTOR OSCILLATOR HAVING TRANSFORMER FEEDBACK

John R. Scantlin and Ralph W. Haas, Los Angeles, Calif., assignors, by mesne assignments, to Lear-Siegler, Inc., a corporation of Delaware Original application Oct. 4, 1956, Ser. No. 613,913. Divided and this application July 18, 1960, Ser. No. 53,328
7 Claims. (Cl. 331—117)

This invention relates to transistor radio receivers and, more particularly, to an improved transistor radio receiver in a system wherein it is desired to selectively call one of many such radio receivers.

In an application for a Broadcast Paging System, Serial No. 432,517, filed May 26, 1954, now Patent No. 2,941,161, by this inventor, there is described a radio receiver of the type which can be called when a sequence of audio tones modulated upon an RF carrier is transmitted, which audio tones are assigned to the receiver desired to be called. The intention was to provide a plurality of small, compact, and light-weight receivers suitable for carrying about on a person. Each one of these receivers has a relay which, when energized, drives a plurality of pairs of resonant contacts. Each one of these pairs of contacts closes only upon being resonated at its frequency of resonance. Thus, by assigning to each receiver a number of different resonant frequencies and by providing a circuit which can be energized through these pairs of contacts only when the pairs of contacts have been resonated in the proper sequence, a system is provided whereby one of the many receivers may be called from a central point to attract the attention of the owner, whereby he is notified that he should make a phone call to determine the reason for his receiver being energized.

This application is a division of copending application Serial No. 613,913 filed October 4, 1956, now abandoned in favor of continuation-in-part application, Serial No. 141,230 filed August 14, 1961.

The receiver described in the above-noted application includes three vacuum tubes, the first one being in a superregenerative circuit, the second one in a relay driver circuit, and the third one in an oscillator circuit. The system operates satisfactorily and provides a fairly compact package. However, with the advent of the transistor, it became apparent that a receiver of the same type employing transistors would have many advantages.

Therefore, an object of this invention is to provide a novel transistor receiver in a selective calling system.

Another object of the present invention is to provide a novel transistor receiver in a selective calling system which has less battery drain than similar receivers existing heretofore.

Another object of the present invention is to provide a novel transistor receiver in a selective calling system which is more compact than similar receivers employed heretofore.

Yet another object of the present invention is the provision of a novel, useful, and simple transistor receiver in a selective receiver calling system.

These and other objects of the invention are achieved by providing a transistor receiver wherein the first stage is a novel, superregenerative detector circuit stage having a tuned output which drives the second stage consisting of a transistor amplifier. This second stage drives a relay having a plurality of pairs of resonant frequency contacts. The third stage is an oscillator stage which remains quiescent in standby condition. A condenser is provided which is charged through one of the pairs of resonant contacts and which can discharge through a second of the pairs of resonant contacts to apply a pulse to the oscillator stage, whereby it is made to commence oscillation. The novel oscillator stage will continue oscillating until it is manually stopped by the operation of a switch. The oscillator stage contains an attention-attracting means, such as a small loudspeaker, which is driven only when the oscillator oscillates.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
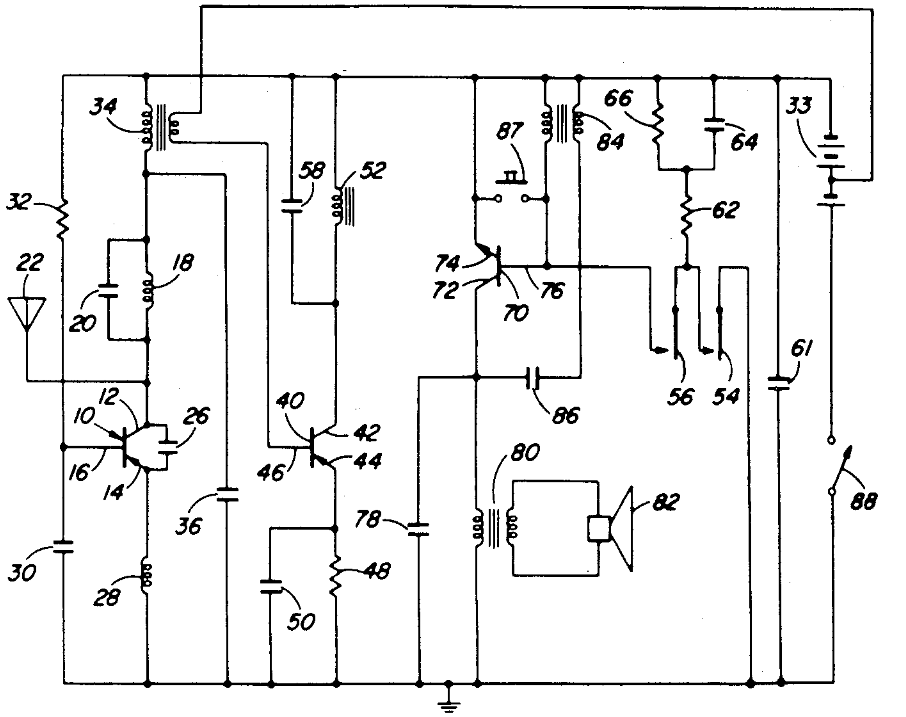
FIGURE 1 is a circuit diagram of an embodiment of the invention.

Reference is now made to FIGURE 1, wherein there is shown a circuit diagram of an embodiment of the invention. This includes a first transistor having a semiconductor body 10, a collector electrode 12, an emitter electrode 14, and a base 16. In the conventional symbols shown, the emitter is indicated by the arrow and the direction or positive emitter current flow is indicated by the direction of the arrow. Thus, since its emitter current normally flows out of the body toward the emitter, an n-p-n junction transistor is represented by a symbol in which the emitter arrow points away from the base. On the other hand, since this emitter current normally flows into the body from the emitter, a junction transistor of the p-n-p type is represented by a symbol in which the emitter arrow points toward the base. For convenience, the conventional transistor symbol used in FIGURE 1 has the emitter arrow pointing toward the base and the battery polarity is chosen for the indicated direction of the emitter current flow. The invention, however, is not limited to any particular type of transistor.

The first transistor is in a superregenerative detector circuit. In order to provide this type of operation, a frequency-determining circuit is connected to the collector electrode. This includes a parallel tuned tank circuit which is also the input circuit to the system. The parallel tuned tank circuit includes an inductance 18 and connected in parallel therewith a condenser 20. The value selected for this inductance and capacitance establishes the frequency of resonance and also the frequency at which the superregenerative detector oscillates. Input to the superregenerative detector may be derived from an antenna 22. Alternatively, the inductance 18 itself may be used as the antenna. Positive feedback for the purpose of insuring oscillation is secured by providing a feedback condenser 26. This is coupled between the collector and the emitter electrodes. The emitter electrode 14 is connected to ground through an inductance 28. This inductance 28 is selected to provide a low-resistance direct-current connection for the emitter 14 to ground. It is also selected, together with the value of the feedback condenser 26, to, in effect, determine the amount of feedback voltage applied to the emitter electrode 14 from the collector electrode 12. This is assured in view of the fact that the feedback condenser 26 and the inductance 28 form a voltage divider circuit for the RF energy being supplied from the collector.

The quench frequency of the superregenerative detector circuit is principally established by the value selected for a condenser 30 connected between the base 16 and ground. A resistor 32 is connected between the base 16 and the battery 33 for the superregenerative detector. An output circuit for the detector includes a transformer 34, having its primary winding in series with the tuned circuit in the collector circuit and its secondary winding connected to the succeeding transistor stage. In operation, as previously indicated, the inductance 18 and capacitance 20 comprise a tuned load which determines the frequency of oscillation. The base 16 is substantially at radio frequency ground, in view of the condenser 30 connecting it to ground. The inductance 28 forms a radio frequency impedance between the emitter and ground. The condenser 26 provides positive feedback, since there is no phase reversal in the grounded base transistor. Thus, the circuit is caused to oscillate at an RF frequency determined primarily by the value of inductance 18 and capacitance 20.

It is typical of a transistor that the base can never be more than a few hundredths of a volt more negative (for p-n-p transistors) than the emitter. Therefore, when the transistor begins to oscillate, by virtue of the positive feedback provided by condenser 26, condenser 30 acquires a positive charge because of the positive excursions of the inductance 28 (the base and emitter act as a diode, allowing the charge on condenser 30 to build up until the transistor cuts off). RF oscillations then cease until capacitor 30 discharges through resistor 32 to a point at which the oscillation can again be sustained. The point at which the oscillation commences depends upon the strength of the external signal being received. Variations in this external signal strength will therefore determine the rate (quench frequency) at which radio-frequency oscillations build up and decay. Total collector current is proportional (logarithmically) to the external field strength, and if the external RF signal is varied at an audio rate, the result will be audio frequency variations of the collector current.

Condenser 36 is tuned with the primary of the transformer 34 so that the frequency of resonance is approximately in the center of the range of the audio frequencies employed for selectively calling a radio receiver. Accordingly, a voltage is developed across the transformer which is proportional to the audio frequency current of the collector current.

The next stage in the receiver comprises the relay driver stage. It also includes a transistor having a semiconductor body 40 and in contact therewith a collector electrode 42, an emitter electrode 44, and a base electrode 46. The secondary of the transformer 34 is connected to the base. The emitter electrode is coupled to ground, through a resistor 48 and in parallel therewith a bypass condenser 50. The value of the resistor 48 is selected so that in effect the emitter receives its current from a high impedance source, which therefore substantially determines the value of the emitter current. In this manner, even though the temperature may vary considerably, the operating characteristic of the transistor is maintained substantially constant. In the collector circuit of the driver transistor, there is provided a relay having a relay coil 52 and a plurality of pairs of resonant contacts 54, 56. Each of these pairs of contacts is made so that it will resonate at a predetermined frequency. A given pair of these contacts will close only when the relay coil is driven at the frequency of resonance. Only two contact pairs are shown by way of example. It will be understood that as many contact pairs as are desired may be employed.

Accordingly, when the superregenerative detector drives the succeeding audio amplifier stage with audio frequencies which are those to which the contacts of the relay are tuned, the relay contacts tuned for those frequencies will close. A condenser 58 is connected in parallel with the relay coil 52 for the purpose of forming a resonant circuit therewith to compensate for any frequency dropoff which may occur.

The first pair of resonant contacts 54 is connected from one side of the source of energy or the battery 33 for the receiver to a resistor 62. The resistor is connected in series with a condenser 64. In parallel with the condenser 64 is connected a resistor 66. This resistor serves the purpose of discharging condenser 64 after a period of time has elapsed. Thus, it will be seen that when the resonant contacts 54 are closed, the condenser 64 may be charged up from the source of potential 33 through the resistor 62. The condenser 61 is an audio-frequency bypass connected across the battery. The resistor 62 is used to insure that the audio oscillation which closes the contacts 54 exists for a given predetermined interval of time. It should not be some transient which can momentarily cause operation of the contacts 54. Further, it is employed to maintain the impedance of the discharge path of the condenser high for reasons to be given subsequently. If after the frequency which operates contacts 54 the frequency which operates contacts 56 occurs, then the charge of the condenser 64 will be applied to the succeeding oscillator stage of the receiver. If, however, this does not occur after a period of time, the charge on the condenser 64 is dissipated through resistor 66.

The third stage of the receiver comprises an oscillator having a semiconductor body 70, a collector electrode 72, a base electrode 76, and an emitter electrode 74. A tuned circuit which determines the frequency of oscillation is connected to the collector electrode. This tuned circuit includes a condenser 78, which is connected in parallel with the primary of a transformer 80. The transformer is an audio transformer and has a sound producer, such as a small speaker, 82 connected to its secondary. Thus, the tuned circuit serves both the function of determining the frequency of oscillation as well as attracting the attention of the wearer of the receiver.

Positive feedback for the purpose of causing oscillation is provided by a stepdown transformer 84, which has its primary connected to the collector electrode through a condenser 86. The secondary of the transformer is connected to the base. The emitter electrode 74 is connected to the base through the secondary of the transformer 84. The base electrode is also connected to the second pair of resonant contacts 56. The attention-attracting stage, or the third stage, of the receiver has the virtue of remaining quiescent during the standby operation. It will, however, burst into oscillation upon receiving the charge from condenser 64 through the contacts 56. It will remain in oscillation actuating the buzzer until such time as the switch 86 is closed temporarily, while serves to connect the emtter directly with the base by passing the secondary of the feedback transformer, or, alternative to that, the power switch 88, which is in series with the battery supplying energy, may be opened.

This third transistor stage may be considered as an audio amplifier wherein a portion of the collector output is fed back to the emitter through the transformer 84. The transformer inverts the phase of the feedback and changes its impedance. Under these conditions of positive feedback, the oscillator stage should oscillate at a frequency determined primarily by the collector tuned circuit. This, however, does not happen because of the connection between the emitter and the base. This is an extremely low impedance connection. Under these conditions, this transistor stage is very close to collector cutoff, and its gain is very low. The gain of an allow junction transistor is a function of its emitter current, which, under the circumstances just described, is low. Thus, the loop gain of this stage is less than one, and, therefore, the circuits will not oscillate and will draw a very small amount of current, on the order of 20 microamperes. If, however, a positive pulse should appear at the base of this transistor stage, it will be amplified and returned in phase by the feedback transformer. If the pulse is of sufficient amplitude, the instantaneous gain of the transistor will reach a value such that the loop gain becomes greater than one. At this point, the transistor is driven into violent saturation by virtue of the positive feedback. The transistor may draw a peak current in the vicinity of 8 milliamperes.

Upon reaching saturation, positive feedback causes the transistor to be returned sharply to cutoff. Energy, however, has been stored in the resonant circuit, including transformer 80 and the parallel condenser 78. The Q of this circuit is sufficient to produce several cycles of ringing, and since this ringing signal is coupled in phase to the input via the feedback transformer, oscillations are maintained. The triggering pulse of this oscillator is received through the contacts 56 from the condenser 64.

Resistor 62 serves a second function. In the event that the contacts 56 may be closed momentarily due to receiving of that frequency for calling another receiver, resistor 62 insures that the impedance of the circuit made with condenser 64, which shunts the base electrode 76, is not low enough to short out and thus stop the oscillations of the oscillator stage. The switch 88, as has been described, serves the function of turning off the battery power when it is desired to not receive any signals whatsoever. The receiver comprises a three-stage selective receiver which is extremely compact, has very little battery drain during standby operation, and can actuate either a speaker or a light, or any other attention-obtaining arrangement desired. Not only is the receiver unique, but also the individual circuits employed therein are considered unique.

Figure 2:
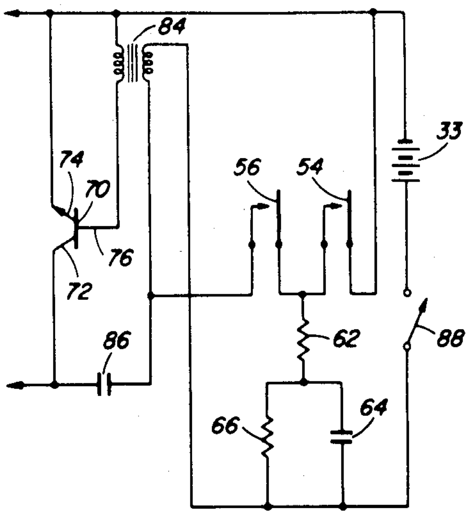
FIGURE 2 is a circuit diagram of an alternative arrangement for the oscillator stage.

Referring to FIGURE 2, there is shown an alternative arrangement for impressing the pulse from the condenser 64 upon the oscillator for the purpose of triggering it into oscillation. In the arrangement shown in FIGURE 1, the condenser is coupled to resistor 62 directly to the base 76 and the charge upon the condenser 64 raises the potential of the base relative to the emitter. In the arrangement shown in FIGURE 2, similar functioning components are given the same reference numerals. In the arrangement shown, the condenser 64 is connected through the resistor 62 and the contacts 56 to the primary winding of the transformer 84. The pulse is applied to the base through the stepdown transformer 84. Thus, it must be insured that the pulse is large enough so that the effects of the stepdown transformer do not render it insufficient to trigger the oscillation stage into oscillation.

There has accordingly been shown and described herein a novel, useful, simple receiver which may be selectively called by the transmission of the audio tones modulated upon an RF carrier. These tones must occur in the sequence in which resonant contacts of a relay are arranged within the receiver. The novel superregenerative detector circuit within the receiver demodulates these audio tones from the RF carrier and applies them to an amplifier stage, which serves the function of driving the relay which has these resonant contact pairs. A novel oscillator stage is quiescent in the standby condition and upon the proper signals being received a voltage pulse, or a charge, is applied to this quiescent oscillator stage to drive it into oscillation. The oscillator stage has a tuned circuit, including attention-attracting means which is energized when the oscillator begins to oscillate.

We claim:

1. In a radio receiver of the type which is to provide an audible indication when paged, a transistor oscillator stage comprising a transistor having base, collector and emitter electrodes, a resonant circuit tuned to resonance at an audio frequency, a source of potential for biasing the collector electrode with respect to said base electrode, means for series connecting said audio frequency resonant circuit and said bias source between said collector and emitter electrodes to provide a collector circuit, low impedance means including an inductance connected between said base and emitter electrodes, means coupled to said collector circuit and inductively coupled to the inductance of said low impedance means for regeneratively feeding back energy from said collector circuit to said low impedance means, means for generating a pulse when the receiver is paged, means for applying said pulse directly between said emitter and base electrodes, the impedance of said feedback means having a proper value for operating said transistor at or near collector cutoff in the absence of a pulse from said source, said pulse being of polarity and magnitude to render the transistor conductive whereby said stage is placed in oscillation by said pulse which oscillation is sustained after the pulse ceases by regenerative feedback.

2. The combination of claim 1 further comprising indicating means, means inductively coupled to said resonant circuit for coupling energy to said indicating means.

3. The combination of claim 2 in which said regenerative feedback means comprises a primary winding coupled to said collector circuit, said primary winding being inductively coupled to said inductance for producing regeneration.

4. The combination of claim 3 in which said pulse applying means comprises means for connecting said pulse generating means in parallel with said primary winding.

5. The combination of claim 1 in which said pulse applying means comprises means for connecting said pulse generating means to said emitter and base electrodes in parallel with the inductance of said low impedance means.

6. The combination of claim 1 in which the said means coupled to said collector current and inductively coupled to the inductance of said low impedance means for regeneratively feeding back energy from said collector circuit comprises an inductance, and in which said pulse applying means comprises means for connecting said pulse generating means in parallel to said last-named inductance.

7. A transistor oscillator comprising a transistor body having base, collector and emitter electrodes, a transformer having a primary and secondary winding, said secondary winding being connected between said base and said emitter, a condenser coupling said primary winding between said emitter and said collector electrodes, a source of potential, a tuned circuit resonant at an audio frequency, said tuned circuit and said source of potential being series connected between said collector and said emitter electrodes, said tuned circuit including a transformer and indicating means coupled to said transformer to be energized therefrom when said oscillator is oscillating, and means to apply a pulse to said base to cause said oscillator to oscillate.

References Cited in the file of this patent

UNITED STATES PATENTS 2,879,480 Reed ---------------- Mar. 24, 1959